Sept. 8, 1970  W. A. ERHARDT, JR  3,526,943
TOOL HEAD ASSEMBLY
Filed May 23, 1968  3 Sheets-Sheet 1
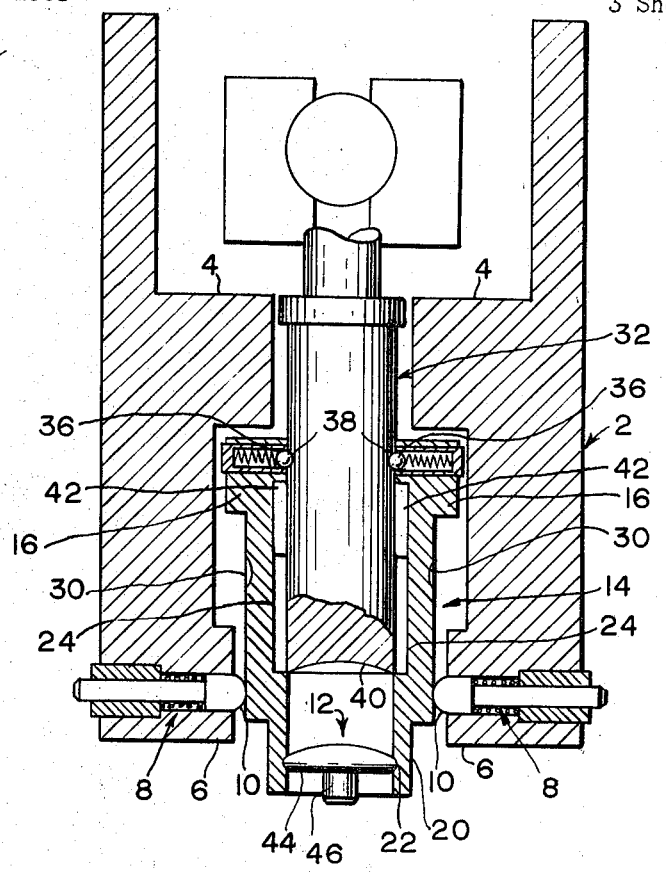
FIG. 1
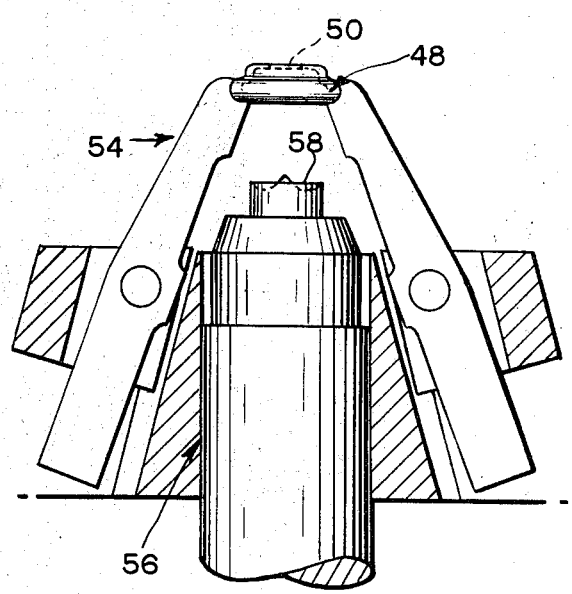
INVENTOR
WILLIAM A. ERHARDT JR.
BY
James R O'Connor
ATTORNEY Sept. 8, 1970

W. A. ERHARDT, JR 3,526,943

TOOL HEAD ASSEMBLY

Filed May 23, 1968

INVENTOR
WILLIAM A. ERHARDT, JR
BY
James R. O'Connor
ATTORNEY

Sept. 8, 1970　　　　W. A. ERHARDT, JR　　　　3,526,943
TOOL HEAD ASSEMBLY
Filed May 23, 1968　　　　　　　　　　　　3 Sheets-Sheet 3
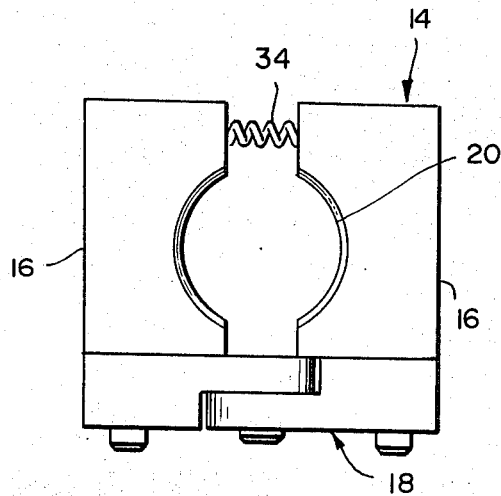
FIG. 3
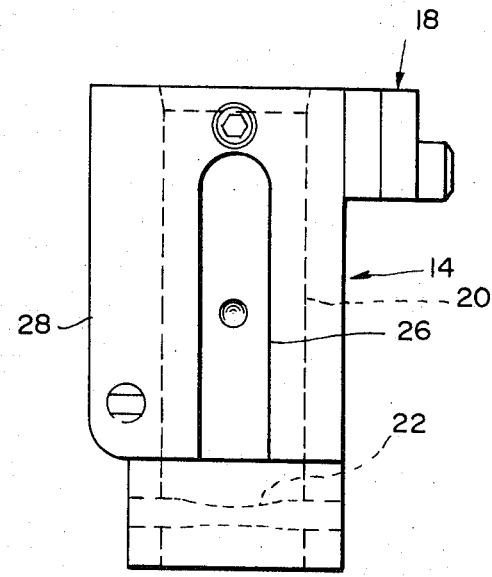
FIG. 5
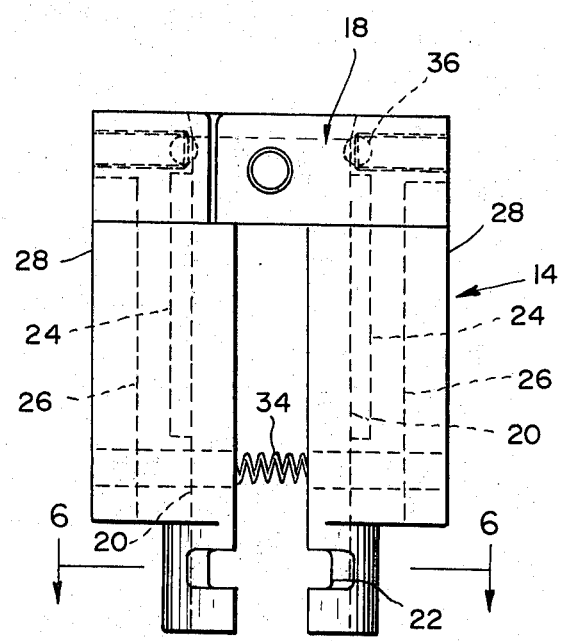
FIG. 4
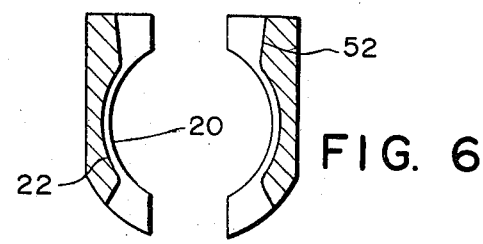
FIG. 6
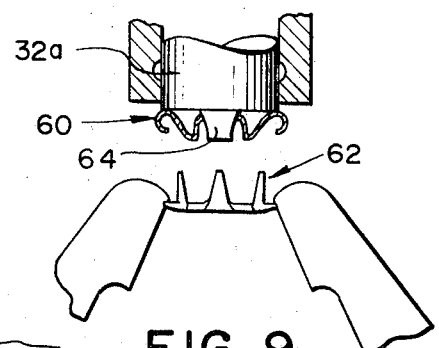
FIG. 9
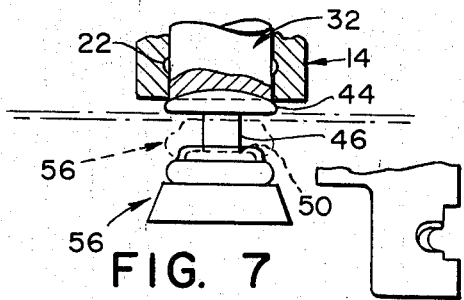
FIG. 7　　FIG. 8
INVENTOR
WILLIAM A. ERHARDT, JR
BY
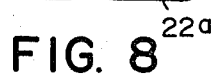
ATTORNEY United States Patent Office 3,526,943
Patented Sept. 8, 1970

3,526,943
TOOL HEAD ASSEMBLY
William A. Erhardt, Jr., South Weymouth, Mass., assignor to United-Carr Incorporated, Boston, Mass., a corporation of Delaware
Filed May 23, 1968, Ser. No. 731,587
Int. Cl. B23p 19/00
U.S. Cl. 29—200                                    10 Claims

ABSTRACT OF THE DISCLOSURE

An upper tool head assembly for a fastener component applying machine has a resilient component part receiving and transporting sleeve which carries parts from an upper part feeding level to a lower part attaching level responsive to the driving stroke of a punch which reciprocates within a bore in the sleeve. The portion of the bore in the sleeve through which the punch travels during the terminal portion of its driving stroke is of uniform diameter whereby the sleeve dilates under tension to permit the punch to move the part through the bore and into engagement with the work solely by reason of the said movement of the part. The sleeve thus maintains a constant aligning tension on the part and substantially eliminates free fall of the part prior to its engaging the work and the other component part of the fastener.

BACKGROUND OF THE INVENTION

Field of the invention

The invention relates to tool head assemblies, in particular, an upper tool head assembly for a fastener component applying machine.

Description of the prior art

Heretofore in the art, tool head assemblies which have functioned in the capacity of the present invention have been characterized by spring-loaded, component part receiving and transporting jaws having converging cam surfaces disposed above the part receiving cavity and adjacent the bore in the jaws through which the part driving and setting punch reciprocates. On the terminal portion of the punch's driving stroke the punch engages the cam surfaces and spreads the jaws to permit the part to drop toward the work ahead of the rapidly descending punch. While this type of prior art head assembly has proved somewhat satisfactory for attaching fastener components wherein the center of gravity of the upper component part is located at or close to its axial geometric center, in that the likelihood of such a part tipping or canting during the short distance through which it travels from jaw release to work and mating component part engagement is minimal, it has proved highly unsatisfactory for attaching fasteners wherein the center of gravity of the upper component part is remote from its axial geometric center, for example, when the part is a capped eyelet having a radially enlarged head and a narrow axial stem of substantial length depending from the head, in that such a part will readily cant off line if allowed to fall free for even a relatively short distance. This canting causes misalignment of the eyelet stem with a stem receiving aperture in the mating component part of the fastener and invariably results in defective attachments and/or damage to one or both of the component parts.

The present invention substantially eliminates the above-described problem by providing a tool head assembly wherein the resilient jaws or sleeve sections which transport the upper component part from the receiving level to the attaching level are spread apart under tension solely by reason of the part being moved through the sleeve by the punch during the terminal portion of its driving stroke. The sleeve sections maintain a constant aligning bias on the part as it is driven toward the work and into engagement with the mating component part of the fastener. Thus the present invention substantially eliminates component part free fall and in so doing markedly increases the operating efficiency of an attaching machine.

SUMMARY OF THE INVENTION

A tool head assembly according to the invention includes a vertically reciprocating punch for applying a part to a workpiece on the driving stroke of the punch, a support housing which is fixed to the apparatus which drives the punch and a part transporting mechanism which carries parts from a feeding level to an attaching level adjacent the work. The transporting mechanism includes a sleeve which is mounted in the support housing, which sleeve is movable from an upper part receiving level toward a lower part applying level and back to the part receiving level responsive to each reciprocation of the punch. The sleeve comprises a pair of sections disposed in face to face relationship and defining a bore in which the punch reciprocates and a part receiving cavity laterally communicating with the bore. The sleeve sections are pivotally connected to each other and resiliently biased toward each other and the punch whereby the said sections will dilate to receive a part in the cavity at the part feeding level and automatically contract to resiliently grip the part and retain it in the cavity during movement of the sleeve toward the part applying level. The mechanism also includes means which releasably couple the sleeve to the punch when the punch is raised and during a portion of its driving stroke and means which stop the downward travel of the sleeve and effect a release of the coupling means intermediate the driving stroke of the punch. When the sleeve ceases its downward movement, the punch continues to drive through the bore therein and engages the part disposed in the cavity and drives the part through the lower end of the bore and into engagement with the work. During the aforesaid terminal portion of the punch's driving stroke, the sleeve sections dilate slightly but maintain a constant aligned tension on the part thereby substantially eliminating any free fall of the part prior to its attachment to the work.

BRIEF DESCRIPTION OF THE DRAWINGS

FIG. 1 depicts the upper and lower tool head assemblies of an attaching machine for affixing a capped eyelet and snap fastener socket combination to a workpiece. The tool head assemblies are shown partly in transverse cross section and partly in full and are disposed at the part feeding and receiving levels with the fasteners setting punches fully retracted;

FIG. 3 is a top plan view of the eyelet transporting sleeve;

FIG. 4 is a rear elevational view of the eyelet transporting sleeve;

FIG. 5 is a right side elevational view of the sleeve;

FIG. 6 is a section taken on line 6—6 of FIG. 4;

FIG. 7 is a fragmentary view of the tools depicting the upper and lower punches just prior to final attachment of the capped eyelet and snap fastener socket to the work;

FIG. 8 is a fragmentary rear view of a modified upper part transporting sleeve for attaching a snap fastener socket and pronged ring combination to a workpiece; and FIG. 9 is another fragmentary view of modified tool heads for attaching the socket and pronged ring combination just prior to engagement of the work and the component parts.

DESCRIPTION OF A PREFERRED EMBODIMENT

Figure 2:
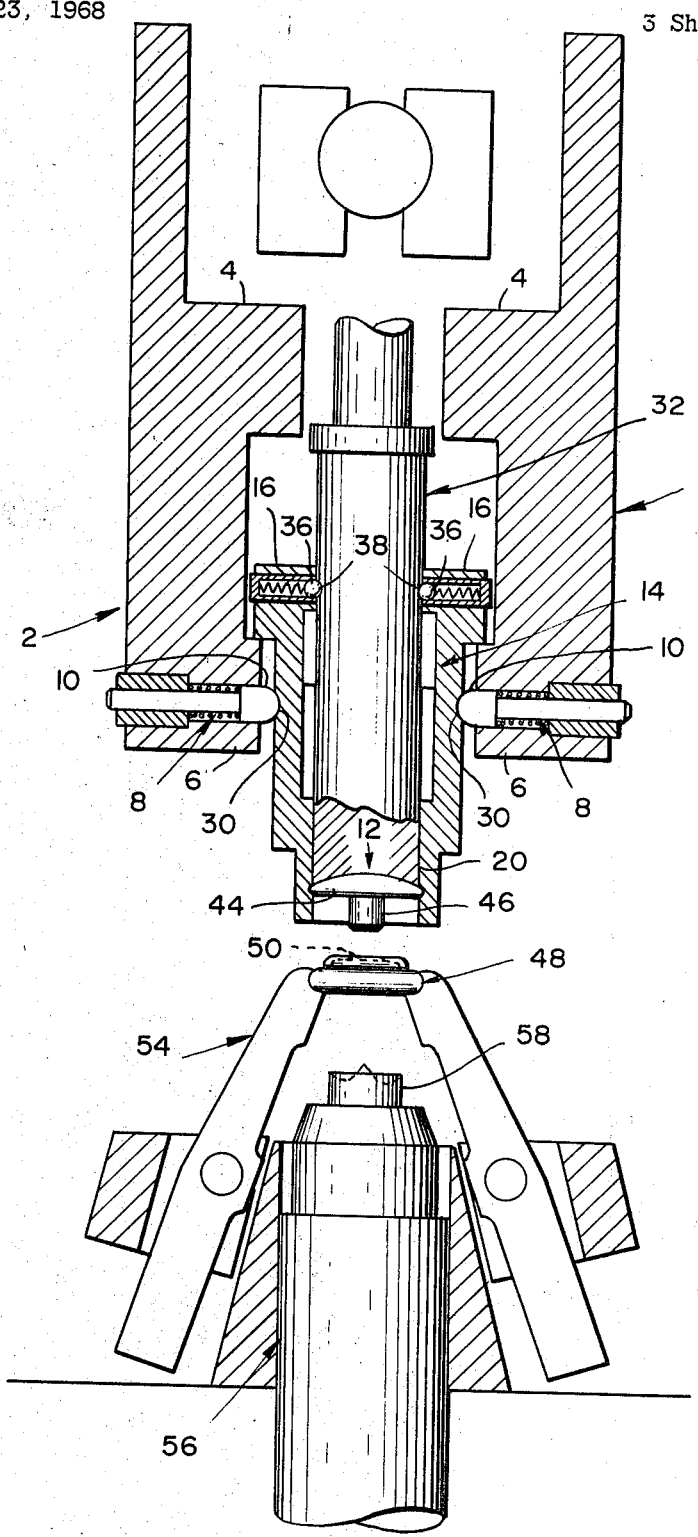
FIG. 2 is a view similar to FIG. 1 depicting the capped eyelet transporting sleeve at its position of maximum descent toward the attaching level and the upper part applying punch at the commencement of the terminal portion of its driving stroke.

An upper tool head assembly according to the invention is adapted to be mounted on the frame of an apparatus, usually an automatically operable press, which drives an upper reciprocating punch. For purposes of this disclosure the punch is considered to be a part of the tool head assembly. The opposed mounting blocks 2 are fixed to the upper frame of the apparatus and are vertically adjustable to raise and lower the tool head assembly depending on the size of the parts and the thickness of the work to which the parts are to be attached. The mounting blocks 2 include a pair of opposed, upper, laterally spaced lugs 4 and a pair of opposed, lower lugs 6, the latter being substantially shorter and narrower than the former. The mounting blocks cooperatively provide a support housing for the tool head assembly. The lower ends of the blocks carry a pair of springloaded detents 8 having hemispherical ends 10 which normally project beyond the internal surfaces of the lower lugs 6. For purposes of this disclosure, the detents 8 are considered to be part of a fastener component part transporting mechanism which carries a part such as the capped eyelet 12 from the part receiving level depicted in FIG. 1 toward the lower attaching level depicted in FIG. 2 where the eyelet is applied to a workpiece, for example, a garment, tarpaulin, etc.

In addition to the detents 8 the eyelet transporting mechanism includes an elongated sleeve 14 comprising two sections 16 which are pivotally connected to each other adjacent their uppermost ends by a linkage 18 which is best depicted in FIG. 3. The internal confronting faces of the sleeve sections 16 define a through bore 20 having a uniform diameter throughout its length, a cavity 22 which laterally communicates with the bore 20 adjacent the lower ends of the sleeve sections, and a pair of opposed keyways 24 which laterally communicate with the bore over a major portion of its length. The elongated recesses 26 which are formed in the outer sides 28 of the sleeve sections 16 each have a shallow, hemispherical notch 30 formed intermediate their length.

The sleeve 14 is mounted in the support housing formed by the blocks 2 between the upper and lower lugs 4 and 6, respectively. The upper lugs 4 overlie the top surfaces of the sleeve sections 16 and the lower lugs 6 are slidably seated in the external recesses 26. The sleeve sections are biased toward each other and the cylindrical upper punch 32 which is reciprocably seated in the bore 20 by the detents 8 which resiliently bear against the inner walls of the recesses 26 and by a spring 34 which extends between the sections forwardly of the bore 20 and above the level of the cavity 22. The upper ends of the sleeve sections 16 carry opposed, spring-loaded ball detents 36 which are biased into the bore 20 and as seen in FIG. 1 resiliently seat in appropriately sized notches 38 formed in the circumference of the punch 32 when the latter is retracted. The punch has a concave leading end 40 and carries a pair of radially extending keys 42 which slidably seat in the keyways 24.

The capped eyelet 12 includes an enlarged head 44 having a convex upper surface and a narrow, hollow stem 46 which depends from the head 44. The maximum external diameter of the head 44 is slightly greater than the diameter of the bore 20 defined by the sleeve sections and approximately equal to the diameter of the cavity 22. The eyelet and the socket 48 shown in the jaws of the lower attaching tool constitute the component parts of a snap fastener which would typically be attached to a workpiece for subsequent mating snap engagement with a stud mounted elsewhere on the workpiece or on another object to which a workpiece will ultimately be secured. The upper end of the socket 48 has an internal opening 50 suitably sized for close tolerance receipt of the stem 46 of the eyelet whereby a hole is pierced in the work as the parts come together after which the stem is crimped under the rim of the said socket opening and the head 44 is clamped against the upper surface of the work. Thus it is obvious that accurate alignment of the stem 46 and the opening 50 in the socket when the parts arrive at the attaching level is absolutely necessary for proper attachment of the fastener component to the work.

In a typical automatic attaching machine embodying the invention, the eyelet 12 is automatically fed into the cavity 22 from a tucker track disposed rearwardly of the tool head assembly such that the eyelet enters the cavity from the back of the sleeve 14 (best depicted in FIG. 4) when the punch 32 and transporting mechanism are in the raised or retracted position shown in FIG. 1. As the eyelet enters the cavity 22 the sleeve sections dilate slightly under the tension of the spring 34 and the compression of the detents 8 as the head 44 of the eyelet passes through the forwardly tapering throat 52 leading into the cavity which is best depicted in FIG. 6. Immediately thereafter the sleeve sections automatically contract to resiliently grip the head of the eyelet once it is fully seated in the cavity. Simultaneously the socket 48 is fed to the snap jaws 54 of the lower tool head assembly while the lower punch 56 is depressed or retracted. The part feeding and attaching operations of such a machine may be semi- or fully automatic and the work may be manually positioned between the tool heads for each attachment or in more sophisticated devices automatically indexed across a work supporting plate by a mechanism which is programmed to alternately move and stop the work for the attachment of fasteners at predetermined spaced intervals.

From a comparison of FIGS. 1 and 2, one will observe that during the initial portion of the driving stroke of the punch 32, the sleeve descends with the punch due to the coupling of the sleeve and punch through the spring-loaded ball detents 36 seating in the notches 38. The sleeve continues its downward travel until stopped by the engagement of the lugs 6 on the mounting posts 2 against the upper walls of the recesses 26 in the sleeve sections. At this point the sleeve's lower end has descended to a point where it lies immediately adjacent the work and the detents 8 have snapped into the notches 30 in the sleeve sections. Thereafter, the punch continues to descend independently of the sleeve since the ball detents 36 are cammed out of the notches 38 and the keys 42 travel freely downwardly in the keyways 24. During this terminal portion of the punch's driving stroke, its concave leading end 40 engages the head 44 of the eyelet and drives it out of the cavity 22 and through the lower portion of bore 20. The stem 46 pierces the work and passes into the aforementioned opening 50 in the socket 48 which is simultaneously driven out of the lower snap jaws 54 and up against the underside of the work by the ascending lower punch 56. The stem 46 is thereafter crimped under the rim of the opening 50 in the socket by the anvil-like leading end 58 of the lower punch 56, whereupon both punches immediately retract. During the descent of the upper punch through the bore 20 the sleeve sections 16 do not spread apart or dilate until the end 40 of the punch actually engages the head of the eyelet. Thereafter, the sleeve sections dilate slightly under the tension of the spring 34 as the head of the eyelet moves out of the cavity 22 and through the lower portion of the bore 20. The sleeve sections thus maintain a constant tension on the eyelet and inhibit free falling of same to insure an accurate axial alignment of the stem with the opening in the socket when the component parts come together against the work.

During the initial portion of the retracting stroke of the punch 32, the sleeve remains in its descended condition due to the engagement of the detents 8 in the notches 30. Subsequently, the keys 42 moving upwardly with the punch engage the upper end walls of the keyways 24 and the sleeve is raised to the eyelet feeding and receiving level after the leading end of the punch has retracted above the cavity 22. Thus the part transporting mechanism is ready to receive another eyelet as soon as it arrives at the feeding level and the sleeve is recoupled to the punch for redescent on the next driving stroke.

FIGS. 8 and 9 depict a slightly modified sleeve 14a in which the cavity 22a is adapted to receive and transport a snap fastener socket 60 which is ultimately secured to the work by a pronged ring 62 driven by a lower punch. The lower end of the upper punch 32a has a downwardly projecting sizing pin 64 which seats in the central stud receiving opening in the socket during the terminal portion of the punch's driving stroke and provides protective support to that region of the socket when the prongs of the ring are turned into the clenching ring of the socket to secure the component parts to the work. Since it is imperative that the sizing pin 64 be properly seated in the socket prior to its engagement by the pronged ring, one will readily understand that the inhibiting of any free falling or movement of the socket in the sleeve 14a prior to its engagement by the punch 32a insures that the socket is held in the line of descent of the sizing pin until the pin is seated and that the invention therefore provides for increased efficiency in the attachment of socket and pronged ringed fastener combinations as well as the capped eyelet and socket combination earlier described.

What is claimed is:

1. A tool head assembly for a part applying apparatus comprising a vertically reciprocating punch for applying a part to the work on the driving stroke of the punch, a support housing fixed to the apparatus, and a part receiving and transporting mechanism including a sleeve mounted in said support housing and movable from an upper part receiving level toward a lower part applying level and back to the part receiving level responsive to each reciprocation of said punch, said sleeve having a pair of sections disposed in face to face relationship and defining a bore in which said punch reciprocates and a part receiving cavity intermediate the ends of said bore and in lateral communication with said bore, said sleeve sections being pivotally connected to each other and resiliently biased toward each other and said punch whereby said sections will dilate to receive a part at the upper level and automatically contract to resiliently grip the part and retain it during movement of the sleeve toward the lower part applying level, means releasably coupling said sleeve to said punch when the latter is raised and during a portion of its driving stroke, and means for stopping the downward travel of said sleeve and effecting a release of said coupling means intermediate the driving stroke of said punch, whereby said punch drives through the bore in said sleeve and engages the part in said cavity and drives the part out of said cavity and through the lower end of said bore and into engagement with the work, said sleeve sections maintaining a constant aligning bias on the part during the aforementioned movement thereof through said bore, thereby substantially eliminating any free fall of the part prior to its engagement with the work.

2. A tool head assembly according to claim 1 wherein said sleeve sections are resiliently biased toward each other and said punch by a spring located adjacent the lower end of said bore.

3. A tool head assembly according to claim 2 wherein the pivotal connection between said sleeve sections is located adjacent the end of said bore remote from said spring biasing said sleeve sections toward each other.

4. A tool head assembly according to claim 1 wherein the diameter of said bore defined by said sleeve sections is uniform throughout the length thereof through which the part applying end of said punch travels subsequent to the release of said coupling means, whereby said sleeve sections dilate under tension during movement of the part out of said cavity and through said bore solely by reason of the said movement of the part.

5. A tool head assembly according to claim 1 including means operable to releasably retain said sleeve adjacent the lower part applying level during the initial portion of the retracting stroke of said punch.

6. A tool head assembly according to claim 5 including means operable during the terminal portion of the retracting stroke of said punch to effect a release of the means recited in claim 5 and to return said sleeve to the upper part receiving level.

7. A tool head assembly according to claim 5 wherein said means set forth therein include a spring loaded detent mounted in said support housing and a notch formed in the exterior of said sleeve for receipt of said detent when said sleeve moves toward the part applying level.

8. A tool head assembly according to claim 6 wherein the means for effecting the release of the means set forth in claim 5 include a key carried by said punch and a keyway formed in said sleeve and communicating with said bore, said key being reciprocable in said keyway and being of a length sufficient to engage the upper end of said keyway during the terminal portion of the retracting stroke of said punch whereby said sleeve is returned to the part receiving level.

9. An upper tool head assembly for a fastener component applying machine of the type having upper and lower component part receiving tool heads and upper and lower punches which reciprocate relative to said tool heads to cooperatively attach the component parts to a workpiece at the completion of the driving strokes of the punches, said upper tool head assembly comprising a support housing which is fixed to the frame of the machine and a component part receiving and transporting mechanism including a sleeve mounted in said support housing and movable from an upper component part receiving level toward a lower component part attaching level adjacent the work and back to the component part receiving level responsive to each reciprocation of the upper punch, said sleeve including a pair of sections disposed in face to face relationship and defining a bore in which the upper punch reciprocates and a component part receiving cavity intermediate the ends of said bore and in lateral communication with said bore, said sleeve sections being pivotally connected to each other and resiliently biased toward each other and the upper punch whereby said sections will dilate to receive a part in said cavity when the punch is raised and said sleeve is disposed at the upper part receiving level and automatically contract to resiliently grip the part and retain it during movement of the sleeve toward the part applying level, means releasably coupling said sleeve to the punch when the latter is retracted and during a portion of its driving stroke and means for stopping the downward travel of said sleeve and effecting a release of said coupling means intermediate the driving stroke of the punch, whereby the punch engages the part in said cavity during the terminal portion of its driving stroke and moves the part out of said cavity and through said bore under the constant aligning bias of said sleeve sections, thereby insuring accurate axial alignment of the component part with the other component part being simultaneously driven toward the work by the lower punch when the parts arrive at the attaching level.

10. An upper tool head assembly according to claim 9 wherein the diameter of the portion of said bore defined by said sleeve sections through which the punch travels subsequent to the release of said coupling means is uniform.

References Cited

UNITED STATES PATENTS

| | | |
|---|---|---|
| 1,085,878 | 2/1914 | Shipley. |
| 2,160,374 | 5/1939 | Veillette. |
| 3,456,483 | 7/1969 | Crothers et al. _____ 72—478 |

THOMAS H. EAGER, Primary Examiner

U.S. Cl. X.R.

72—478